(12) United States Patent
Shimakage

(10) Patent No.: US 10,474,158 B2
(45) Date of Patent: Nov. 12, 2019

(54) VEHICLE TRAVEL CONTROL METHOD AND TRAVEL CONTROL DEVICE

(71) Applicant: Nissan Motor Co., Ltd., Yokohama-shi, Kanagawa (JP)

(72) Inventor: Masayasu Shimakage, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/331,431

(22) PCT Filed: Sep. 9, 2016

(86) PCT No.: PCT/JP2016/076600
§ 371 (c)(1),
(2) Date: Mar. 7, 2019

(87) PCT Pub. No.: WO2018/047292
PCT Pub. Date: Mar. 15, 2018

(65) Prior Publication Data
US 2019/0227563 A1 Jul. 25, 2019

(51) Int. Cl.
*G05D 1/02* (2006.01)
*G06K 9/00* (2006.01)

(52) U.S. Cl.
CPC ......... *G05D 1/0221* (2013.01); *G05D 1/0246* (2013.01); *G06K 9/00798* (2013.01)

(58) Field of Classification Search
CPC ........... B60T 2201/08; B60T 2201/087; B60T 2201/089; B60T 2201/082; B60T 2201/083; B62D 15/025; B62D 15/021; B62D 1/28
See application file for complete search history.

(56) References Cited

U.S. PATENT DOCUMENTS 6,580,986 B1 * 6/2003 Uenuma .............. B62D 15/025
180/168
9,227,553 B2 * 1/2016 Nordbruch ............. B60Q 1/085
(Continued)

FOREIGN PATENT DOCUMENTS

JP  2002002427 A  1/2002
JP  2005182186 A  7/2005
(Continued)

*Primary Examiner* — Redhwan K Mawari
(74) *Attorney, Agent, or Firm* — Young Basile Hanlon & MacFarlane, P.C.

(57) ABSTRACT

A travel control method for a vehicle detects a target trajectory along which a subject vehicle should travel and controls the subject vehicle to travel in an autonomous manner along the detected target trajectory. This method includes provisionally setting a forward gaze point distance from the subject vehicle to a forward gaze point, estimating a traveling trajectory in which the subject vehicle coincides with the target trajectory at the forward gaze point, detecting a maximum value of a lateral displacement between the estimated traveling trajectory and the target trajectory during travel from a current position of the subject vehicle to the forward gaze point, and definitely setting the forward gaze point distance when the maximum value of the lateral displacement is a predetermined value or less as an actual forward gaze point distance and controlling the subject vehicle to travel on the basis of the definitely-set forward gaze point distance.

6 Claims, 7 Drawing Sheets

(56) References Cited

U.S. PATENT DOCUMENTS

| | | | |
|---|---|---|---|
| 9,616,926 B2* | 4/2017 | Yang | B62D 15/0285 |
| 9,862,383 B2* | 1/2018 | Grinenval | B60W 30/10 |
| 9,950,740 B2* | 4/2018 | Sato | B62D 15/025 |
| 9,988,082 B2* | 6/2018 | Okada | G06K 9/00798 |
| 10,046,762 B2* | 8/2018 | Sundaram | B60W 50/06 |
| 2002/0007236 A1* | 1/2002 | Sadano | B62D 1/28 |
| | | | 701/28 |
| 2002/0013647 A1* | 1/2002 | Kawazoe | B62D 1/28 |
| | | | 701/41 |
| 2002/0041229 A1* | 4/2002 | Satoh | G05D 1/0246 |
| | | | 340/438 |
| 2002/0169531 A1* | 11/2002 | Kawazoe | B62D 1/286 |
| | | | 701/41 |
| 2003/0078712 A1* | 4/2003 | Shimakage | B62D 1/286 |
| | | | 701/41 |
| 2003/0103649 A1* | 6/2003 | Shimakage | G06K 9/00798 |
| | | | 382/104 |
| 2004/0183663 A1* | 9/2004 | Shimakage | B62D 15/029 |
| | | | 340/436 |
| 2005/0107931 A1* | 5/2005 | Shimakage | B62D 15/025 |
| | | | 701/41 |
| 2012/0044708 A1* | 2/2012 | Schmidt | B60Q 1/12 |
| | | | 362/466 |
| 2015/0183460 A1 | 7/2015 | Oyama | |
| 2016/0052547 A1* | 2/2016 | Kashiwai | B60W 30/10 |
| | | | 701/41 |
| 2017/0240186 A1* | 8/2017 | Hatano | B60W 10/04 |
| 2017/0291603 A1* | 10/2017 | Nakamura | B60W 30/09 |
| 2018/0037223 A1* | 2/2018 | Goto | B60W 30/12 |
| 2019/0084579 A1* | 3/2019 | Maura | B60W 30/18163 |
| 2019/0227563 A1* | 7/2019 | Shimakage | B60W 30/12 |

FOREIGN PATENT DOCUMENTS

| | | |
|---|---|---|
| JP | 2009241870 A | 10/2009 |
| JP | 2014218098 A | 11/2014 |
| JP | 2015123929 A | 7/2015 |
| JP | 2016107658 A | 6/2016 |

\* cited by examiner

VEHICLE TRAVEL CONTROL METHOD AND TRAVEL CONTROL DEVICE

TECHNICAL FIELD

The present invention relates to a travel control method and a travel control apparatus that control the travel of a vehicle.

BACKGROUND

A lane-keeping control device is known which controls a subject vehicle to travel along a target trajectory in an automated or autonomous manner (Japanese Patent Application No. JP2015-123929A, for example). When the traveling road width is wide, this device operates to set a lateral position feedback gain to a larger value than that when the traveling road width is narrow, thereby to perform natural and stable steering assistance in an expressway having a wide traveling road width. On the other hand, in a general road having a narrow traveling road width, optimum lane-keeping control is executed without interfering with the driver's avoidance maneuver.

In the above-described conventional lane-keeping control, however, the positional misalignment amount between the vehicle trajectory and the target trajectory at a forward gaze point is calculated to calculate a lateral position feedback control amount; therefore, on a road in which the variation in the curvature radius R is not monotonous, such as a general urban road that includes entry into an intersection and exit from an intersection, the current lateral position may take a shortcut or a detour with respect to the target trajectory, which may be problematic.

SUMMARY

A problem to be solved by the present invention is to provide a travel control method for a vehicle and a travel control apparatus for a vehicle with which the subject vehicle can be appropriately controlled to travel in an autonomous manner along a target trajectory without taking a shortcut or a detour with respect to the target trajectory.

The present invention solves the above problem in the following manner. In a travel control method for a vehicle in which the subject vehicle is controlled to travel in an autonomous manner along a target trajectory, before a forward gaze point distance from the subject vehicle to a forward gaze point is set, the forward gaze point distance is provisionally set, and a traveling trajectory of the subject vehicle is estimated in which the subject vehicle coincides with the target trajectory at the forward gaze point if the subject vehicle travels the provisionally-set forward gaze point distance. Then, a maximum value of a lateral displacement between the estimated traveling trajectory of the subject vehicle and the target trajectory during travel from a current position of the subject vehicle to the forward gaze point is detected, the forward gaze point distance when the maximum value of the lateral displacement is a predetermined value or less is definitely set as an actual forward gaze point distance, and the subject vehicle is then controlled to travel in an autonomous manner on the basis of the definitely-set forward gaze point distance.

According to the present invention, before the forward gaze point distance is set, the traveling trajectory of the subject vehicle is estimated for the provisionally-set forward gaze point distance and an appropriate forward gaze point distance is searched for until the maximum value of the lateral displacement between the estimated traveling trajectory of the subject vehicle and the target trajectory becomes the predetermined value or less; therefore, the forward gaze point distance to be actually set is already optimized. As a result, the subject vehicle can be appropriately controlled to travel in an autonomous manner along the target trajectory without taking a shortcut or a detour with respect to the target trajectory.

DETAILED DESCRIPTION

Hereinafter, the apparatus and method for controlling the travel of a vehicle according to an embodiment of the present invention will be described with reference to the drawings. In the present embodiment, the present invention will be described by exemplifying a travel control apparatus equipped in a vehicle.

Figure 1:
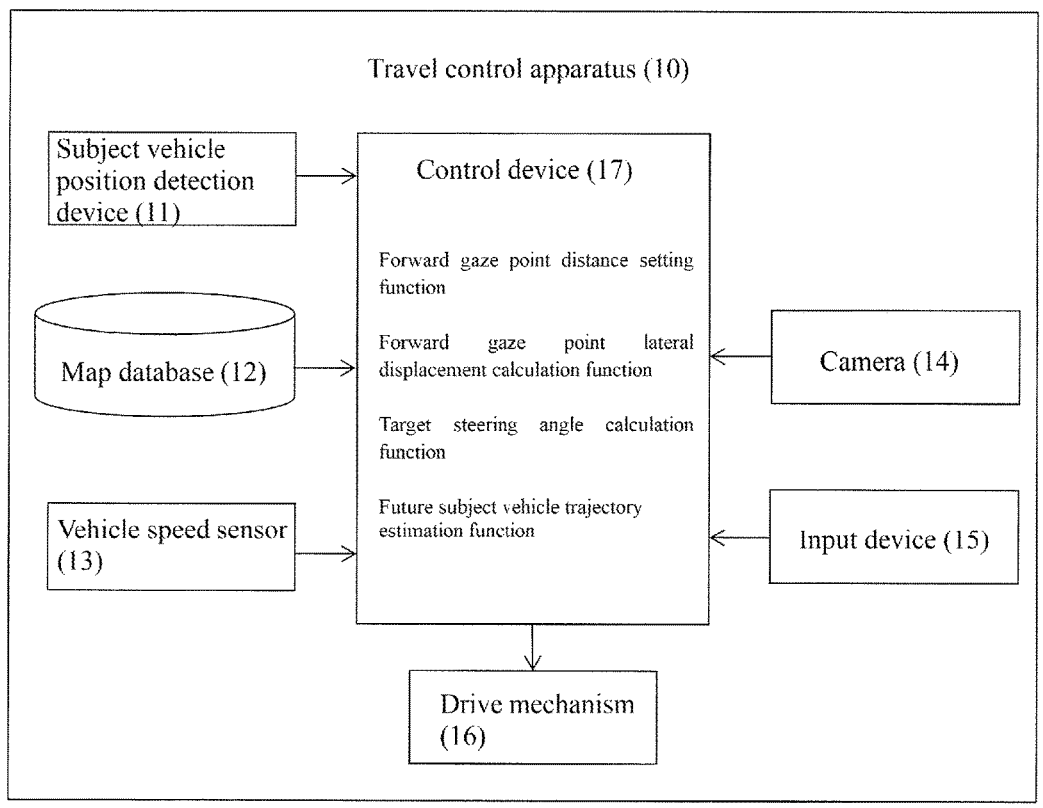
FIG. 1 is a block diagram illustrating a travel control apparatus according to an embodiment of the present invention.

FIG. 1 is a block diagram illustrating the configuration of a travel control apparatus 10 according to an embodiment of the present invention. As illustrated in FIG. 1, the travel control apparatus 10 according to the present embodiment includes a subject vehicle position detection device 11, a map database 12, a vehicle speed sensor 13, a camera 14, an input device 15, a drive mechanism 16, and a control device 17. These components are connected to one another via a controller area network (CAN) or other in-vehicle LAN for mutually exchanging information.

The subject vehicle position detection device 11, which includes a GPS unit, detects radio waves transmitted from a plurality of communication satellites to periodically acquire positional information of the subject vehicle and detects the current position of the subject vehicle on the basis of the acquired positional information of the subject vehicle, angle variation information acquired from a gyro-sensor, and a vehicle speed acquired from the vehicle speed sensor. In addition or alternatively, the subject vehicle position detection device 11 can detect the position of the subject vehicle using a well-known map matching technique. The positional information of the subject vehicle detected by the subject vehicle position detection device 11 is output to the control device 17.

The map database 12 stores map information. In the map information stored in the map database 12, not only node information but also information on the road shape at each map coordinate, for example, attributes regarding curves, slopes, intersections, interchanges, narrow roads, straight roads, road shoulder structures, and merging points, are recorded so as to be associated with the map coordinates. The map information stored in the map database 12 is read out to the control device 17.

The vehicle speed sensor 13 measures the rotation speed of a drive system, such as a drive shaft, and detects the traveling speed (also referred to as a "vehicle speed," hereinafter) of the subject vehicle on the basis of the measured rotation speed. The vehicle speed information of the subject vehicle detected by the vehicle speed sensor 13 is output to the control device 17. For the automated or autonomous steering control based on a forward gaze point model which will be described later, a yaw rate sensor, an acceleration sensor, and other necessary sensors are provided.

The camera 14 captures images of a road and/or an object around the subject vehicle. In the present embodiment, the camera 14 captures images ahead of the subject vehicle and detects lane markers of a lane in which the subject vehicle travels, from the obtained image information. The image information captured by the camera 14 is output to the control device 17.

The input device 15 is an operation member that can be operated by a driver. In the present embodiment, the driver can operate the input device 15 thereby to set ON/OFF of the automated or autonomous travel control. In the automated or autonomous travel control of the vehicle according to the present embodiment, so-called lane-keeping travel control is executed in which the subject vehicle is controlled to travel, for example, along the center of the lane (region defined by lane markers) detected by the camera 14. Another automated or autonomous travel control may be additionally used. For example, when a preceding vehicle is present ahead of the subject vehicle, inter-vehicle distance control may be used in which the subject vehicle is controlled to travel so that the inter-vehicle distance between the subject vehicle and the preceding vehicle is maintained at an inter-vehicle distance that is set by the driver, while when no preceding vehicle is present ahead of the subject vehicle, speed control may be used in which the subject vehicle is controlled to travel at a vehicle speed that is set by the driver.

The drive mechanism 16 includes an engine and/or a motor (power system), a brake (braking system), and a steering actuator (steering system) for controlling the subject vehicle to travel in an automated or autonomous manner. In the present embodiment, when performing the automated or autonomous travel control to be described later, the control device 17 controls the operation of the drive mechanism 16.

The control device 17 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as an operating circuit.

The control device 17 executes the programs stored in the ROM using the CPU thereby to achieve the following functions: a subject vehicle information acquisition function of acquiring subject vehicle information regarding the traveling state of the subject vehicle; a traveling lane information acquisition function of acquiring traveling lane information (including a target trajectory) obtained ahead of the subject vehicle; a forward gaze point distance setting function of provisionally setting a forward gaze point distance in accordance with the traveling lane information and the traveling state of the subject vehicle; a forward gaze point lateral displacement calculation function of calculating a lateral displacement between the current position of the subject vehicle and the provisionally-set forward gaze point; a future subject vehicle trajectory estimation function of estimating a traveling trajectory of the subject vehicle if the subject vehicle travels from the current position to the provisionally-set forward gaze point; and a travel control function (including a lane-keeping function) of controlling the travel of the subject vehicle. These functions of the control device 17 will be described below.

The control device 17 uses the subject vehicle information acquisition function to acquire the subject vehicle information regarding the traveling state of the subject vehicle. For example, the control device 17 can use the subject vehicle information acquisition function to acquire, as the subject vehicle information, the positional information of the subject vehicle from the subject vehicle position detection device 11 and the vehicle speed information of the subject vehicle from the vehicle speed sensor 13.

The control device 17 uses the traveling lane information acquisition function to acquire the traveling lane information which includes information on the lane makers of the traveling lane located ahead of the subject vehicle and/or the shape (such as the road width, curvature radius, and length) of the traveling lane, and other information. For example, the control device 17 performs a binarization process or the like on the image data from the camera 14 thereby to detect the lane markers of the traveling lane located ahead of the subject vehicle and specifies the target trajectory along which the subject vehicle should travel. The target trajectory may be, for example, the centerline of the traveling lane.

Figure 3:
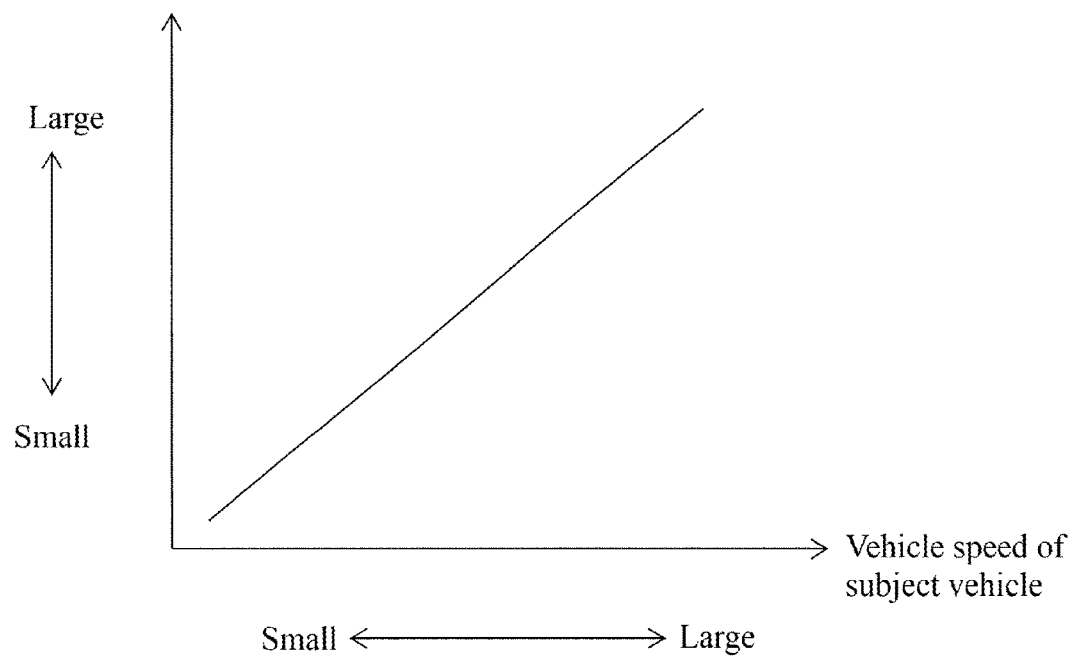
FIG. 3 is a graph illustrating the relationship between a forward gaze point distance that is provisionally set in step S2 of FIG. 2 and the vehicle speed of the subject vehicle.

The control device 17 uses the forward gaze point distance setting function to provisionally set the forward gaze point distance in accordance with the traveling lane information acquired using the traveling lane information acquisition function and the traveling state of the subject vehicle acquired using the subject vehicle information acquisition function. FIG. 3 is a graph illustrating an example of the relationship between the forward gaze point distance, which is provisionally set using the forward gaze point distance setting function, and the vehicle speed of the subject vehicle. In the present embodiment, the forward gaze point distance is provisionally set larger as the current vehicle speed of the subject vehicle increases, and the forward gaze point distance is provisionally set smaller as the current vehicle speed of the subject vehicle decreases. For example, provided that the distance to one second forward when the subject vehicle travels at the current vehicle speed is provisionally set as the forward gaze point distance, the forward gaze point distance is provisionally set to 20 m when the vehicle speed is 20 m/s, and the forward gaze point distance is provisionally set to 30 m when the vehicle speed is 30 m/s. Provisional setting of the forward gaze point distance illustrated in FIG. 3 is merely an example, and the travel control method and travel control apparatus of the present invention are not limited to the provisional setting example illustrated in the figure. For example, a predetermined fixed value may be provisionally set as the forward gaze point distance.

The control device 17 uses the forward gaze point lateral displacement calculation function to calculate a lateral displacement between the current position of the subject vehicle and the position of the subject vehicle if the subject vehicle travels the provisionally-set forward gaze point distance, on the basis of the current position of the subject vehicle, the target trajectory, and the position of the subject vehicle if the subject vehicle travels the above provisionally-set forward gaze point distance along the target trajectory. The control device 17 also uses the forward gaze point lateral displacement calculation function to calculate a target steering angle with which the calculated lateral displacement becomes zero, that is, with which the subject vehicle coincides with the target trajectory at the provisionally-set forward gaze point.

The control device 17 uses the future subject vehicle trajectory estimation function and the target steering angle to estimate a traveling trajectory of the subject vehicle in which the subject vehicle coincides with the target trajectory acquired using the traveling lane information acquisition function at the provisionally-set forward gaze point if the subject vehicle travels the forward gaze point distance which is provisionally set using the above forward gaze point distance setting function. This estimation of the traveling trajectory of the subject vehicle can be performed, for example, using a forward gaze point model (a control model in which the steering wheel is turned so that the separation between the forward gaze point and the target trajectory becomes small).

Figure 5:
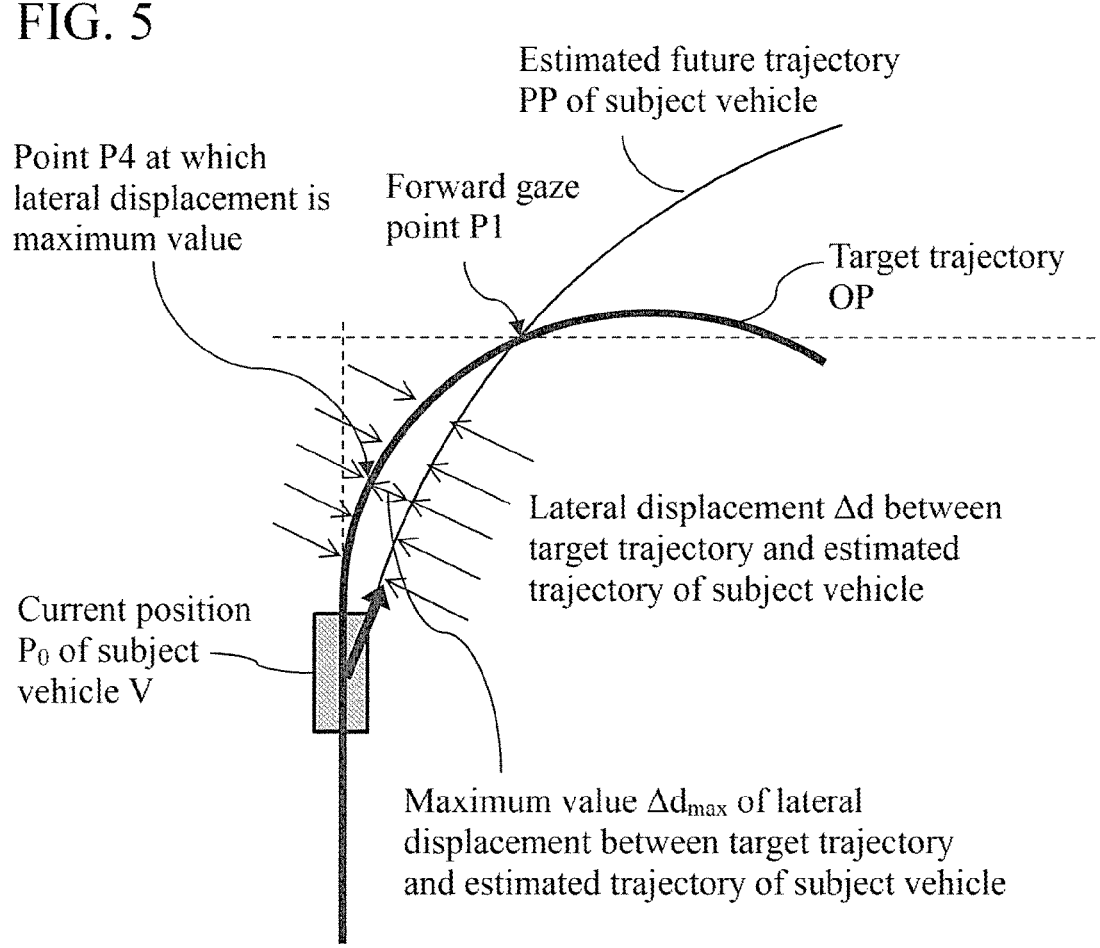
FIG. 5 is a plan view illustrating a scene for describing the maximum value, which is determined in step S5 of FIG. 2, of a lateral displacement between an estimated traveling trajectory of the subject vehicle and a target trajectory.

The control device 17 also uses the future subject vehicle trajectory estimation function to detect a maximum value of the lateral displacement between the estimated traveling trajectory of the subject vehicle and the target trajectory during the travel from the current position of the subject vehicle to the forward gaze point. FIG. 5 is a plan view illustrating a scene for describing a maximum value $\Delta d_{max}$ of a lateral displacement $\Delta d$ between an estimated traveling trajectory PP of the subject vehicle and a target trajectory OP. In the figure, the subject vehicle V travels along the target trajectory OP toward the upper side of the drawing. The above-described forward gaze point distance setting function serves to provisionally set a forward gaze point P1 on the target trajectory, calculate the target steering angle on the basis of the lateral displacement between a current position $P_0$ of the subject vehicle and the provisionally-set forward gaze point P1, and obtain an estimated future trajectory PP of the subject vehicle using the target steering angle. In this state, as illustrated in FIG. 5, the lateral displacement $\Delta d$ between the estimated traveling trajectory PP of the subject vehicle V and the target trajectory OP during the travel from the current position P0 of the subject vehicle to the provisionally-set forward gaze point P1 refers to a distance between the target trajectory OP and the estimated trajectory PP in the vehicle lateral direction when the subject vehicle V travels the target trajectory OP. A number of values of this lateral displacement $\Delta d$ are calculated at a predetermined interval, for example, as illustrated in the figure, and the maximum value $\Delta d_{max}$ is obtained from among these values. The interval when calculating the lateral displacement $\Delta d$ is not particularly limited and may preferably be set with consideration for the balance between the accuracy in the maximum value $\Delta d_{max}$ and the calculation load because, as the interval is reduced, the accuracy in the maximum value $\Delta d_{max}$ is improved but the calculation load becomes high.

The control device 17 uses the future subject vehicle trajectory estimation function to definitely set the forward gaze point distance when the maximum value $\Delta d_{max}$ of the lateral displacement is a predetermined value D or less, as an actual forward gaze point distance. In this definite setting, when the maximum value $\Delta d_{max}$ of the lateral displacement between the target trajectory and the traveling trajectory of the subject vehicle estimated on the basis of the provisionally-set forward gaze point distance exceeds the predetermined value D, until the maximum value $\Delta d_{max}$ of the lateral displacement becomes the predetermined value D or less, the forward gaze point distance L1 (distance between $P_0$ and P1) to be provisionally set is successively changed (P1→P2→P3) and the traveling trajectory PP of the subject vehicle is estimated again for each of the forward gaze point distances L2 (distance between $P_0$ and P2) and L3 (distance between $P_0$ and P3) which are thus changed and set again. Although not particularly limited, when successively changing the forward gaze point distance to be provisionally set, it is preferred to successively reduce the forward gaze point distance to be provisionally set.

As the forward gaze point distance from the current position of the subject vehicle to the forward gaze point is set shorter, the operation of the subject vehicle is liable to quickly follow the target trajectory while observing the vicinity of the subject vehicle; therefore, the followability to the target trajectory will be good, but the target steering angle and/or the vehicle behavior may be too sensitive and unstable so that only the current lateral displacement is emphasized. In contrast, setting the forward gaze point distance longer leads to an operation in which it is enough to recover the target trajectory after the forward gaze point distance; therefore, stable target steering angle and/or vehicle behavior can be obtained by the estimation control which takes into account not only the lateral displacement from the target trajectory but also the direction and/or yaw rate of the subject vehicle with respect to the target trajectory, but the followability to the target trajectory may be slow. In view of the above, in the present embodiment, when executing the lane-keeping control in the forward gaze point model, the forward gaze point distance is appropriately set so as to balance the quick followability to the target trajectory and the stability of the vehicle behavior.

That is, in the provisional setting, the forward gaze point distance is selected in accordance with the traveling lane information and the vehicle speed of the subject vehicle, the forward gaze point P1 to be provisionally set is successively changed to a smaller value (P1→P2→P3) until the maximum value $\Delta d_{max}$ of the lateral displacement $\Delta d$ between the target trajectory OP and the traveling trajectory PP of the subject vehicle V estimated on the basis of the provisionally-set forward gaze point distance becomes the predetermined value D or less, and the forward gaze point distance when the maximum value $\Delta d_{max}$ of the lateral displacement becomes the predetermined value D or less is definitely set as an actual forward gaze point distance. Thus, the forward gaze point distance to be definitely set is the maximum distance among a number of values of the forward gaze point distance in which the maximum value $\Delta d_{max}$ of the lateral displacement between the target trajectory OP and the traveling trajectory PP of the subject vehicle estimated on the basis of the provisionally-set forward gaze point distance becomes the predetermined value or less. As a result, the forward gaze point distance to be definitely set is a value that allows the quick followability to the target trajectory and the stability of the vehicle behavior to be optimally balanced.

The control device 17 uses the travel control function to control the drive mechanism 16 thereby to execute the automated or autonomous travel control in which all or part of the travel of the subject vehicle is performed in an automated or autonomous manner. For example, the travel control function in the present embodiment serves to control the operation of the drive mechanism 16, such as the engine, brake, and steering actuator, thereby to execute the lane-keeping control in which the subject vehicle is controlled to travel along the target trajectory. When a preceding vehicle is present ahead of the subject vehicle, the travel control function may serve to control the operation of the drive mechanism 16, such as the engine and brake, thereby to execute the inter-vehicle distance control in which the subject vehicle is controlled to travel so as to separate from the preceding vehicle by an inter-vehicle distance that is set using the inter-vehicle distance setting function. In addition or alternatively, when a preceding vehicle is present ahead of the subject vehicle or when no preceding vehicle is present ahead of the subject vehicle, the travel control function may serve to control the operation of the drive mechanism 16, such as the engine and brake, thereby to execute the speed control in which the subject vehicle is controlled to travel at a certain vehicle speed that is set by the driver.

Figure 2:
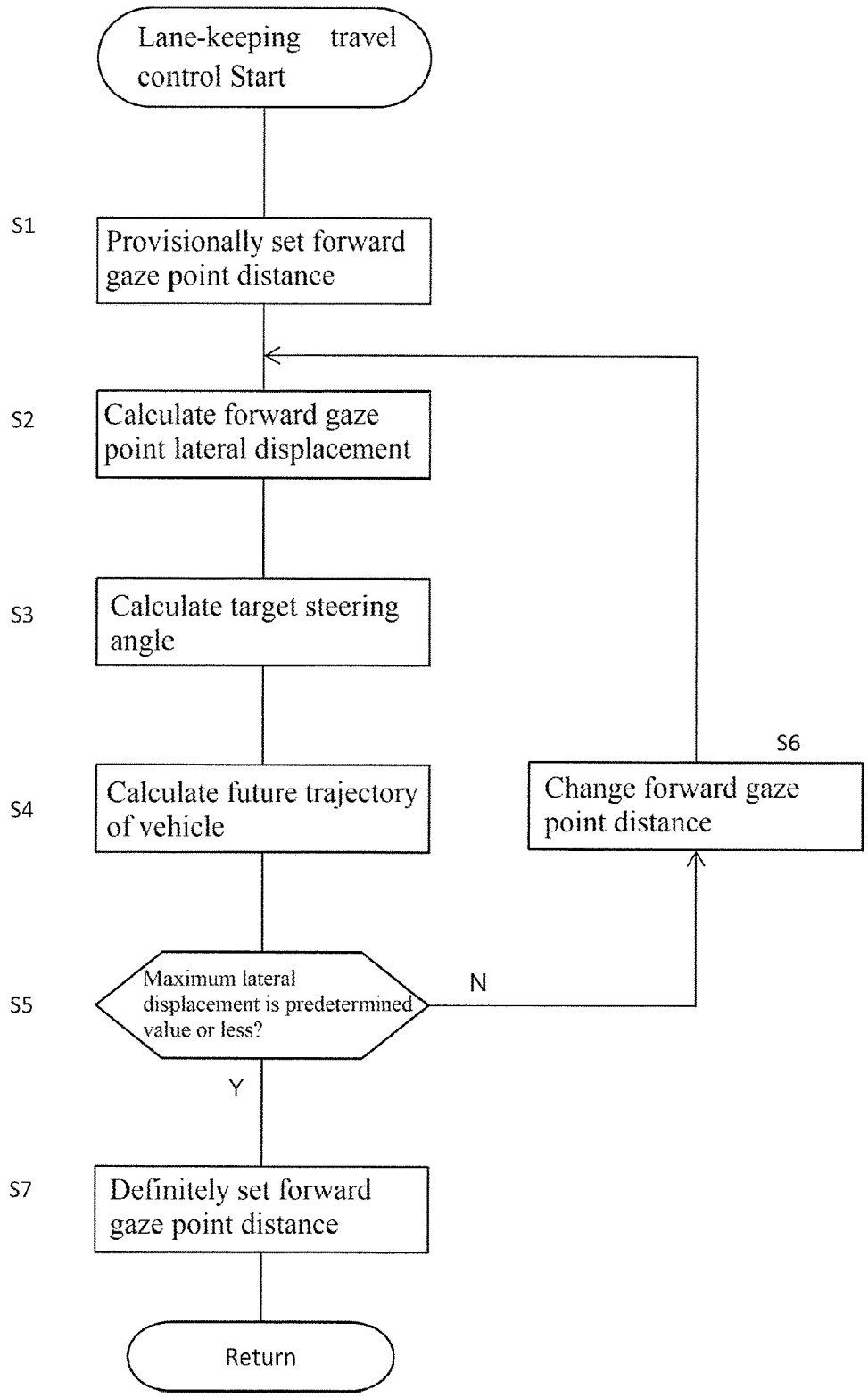
FIG. 2 is a flowchart illustrating a travel control process executed in a control device of FIG. 1.

The travel control process of the present embodiment will then be described. FIG. 2 is a flowchart illustrating the travel control process according to the present embodiment. The travel control process described below is executed by the control device 17. The travel control process described below is started when the ignition switch or power switch is turned on, and repeatedly executed with a predetermined period (e.g. every 10 ms) until the ignition switch or power switch is turned off. The following description is based on an exemplary scene in which the lane-keeping travel control is input (turned on) by the driver.

In step S1, the subject vehicle information acquisition function of the control device 17 serves first to perform acquisition of the subject vehicle information regarding the traveling state of the subject vehicle. For example, the subject vehicle information acquisition function can serve to acquire, as the subject vehicle information, the positional information of the subject vehicle from the subject vehicle position detection device 11 and the vehicle speed information of the subject vehicle from the vehicle speed sensor 13. Then, the forward gaze point distance setting function of the control device 17 serves to provisionally set the forward gaze point P1 (see the left part of FIG. 4) on the basis of the current position of the subject vehicle, the traveling lane information, and the vehicle speed of the subject vehicle, for example, as illustrated in FIG. 3. The provisional setting as referred to herein is to be performed on calculation for preliminarily obtaining an optimum forward gaze point distance rather than for obtaining the forward gaze point distance which is used in the actual lane-keeping travel control.

In step S2, the image data captured by the camera 14 ahead of the subject vehicle is processed, and the positional relationship between the subject vehicle and the traveling lane is detected to obtain the target trajectory. That is, the traveling lane information acquisition function of the control device 17 serves to detect the lane markers of the traveling lane located ahead of the subject vehicle and to specify the target trajectory along which the subject vehicle should travel. The target trajectory is, for example, the centerline of the traveling lane. Then, the lateral displacement is calculated between the current position $P_0$ of the subject vehicle and the position P1 of the subject vehicle if the subject vehicle travels the forward gaze point distance which is provisionally set in step S1. The reference for the position of the subject vehicle may be, for example, the center axis of the vehicle body.

In step S3, the target steering angle with which the position of the subject vehicle coincides with the target trajectory at the forward gaze point P1 is calculated from the lateral displacement between the target trajectory at the forward gaze point P1 obtained in step S2 and the current position of the subject vehicle. Then, in step S4, the future subject vehicle trajectory estimation function of the control device 17 serves to use a forward gaze point model or the like to estimate the traveling trajectory of the subject vehicle if the subject vehicle is controlled with the target steering angle calculated in step S3 (see "Estimated future trajectory PP of subject vehicle" in the left part of FIG. 4).

In step S5, the future subject vehicle trajectory estimation function of the control device 17 serves to detect the maximum value $\Delta d_{max}$ of the lateral displacement between the estimated traveling trajectory PP of the subject vehicle and the target trajectory OP during the travel from the current position $P_0$ of the subject vehicle to the provisionally-set forward gaze point P1. This detection method may include calculating a number of values of the lateral displacement $\Delta d$ at a predetermined interval, as illustrated in FIG. 5, for example, and obtaining the maximum value $\Delta d_{max}$ from among these values. Then, a determination is made as to whether or not the maximum value $\Delta d_{max}$ of the lateral displacement is the predetermined value D or less. This predetermined value D may be preliminarily obtained by experiments and/or simulations as a value that allows the lane-keeping control to be achieved in which the quick followability to the target trajectory and the stability of the vehicle behavior are balanced.

When, in step S5, the maximum value $\Delta d_{max}$ of the lateral displacement is the predetermined value D or less, the process proceeds to step S7, in which the forward gaze point distance (distance between $P_0$ and P1 herein) having been provisionally set at that time is definitely set as an actual forward gaze point distance. On the other hand, when, in step S5, the maximum value $\Delta d_{max}$ of the lateral displacement is not the predetermined value D or less, the process proceeds to step S6, in which the forward gaze point distance is changed to a forward gaze point distance between $P_0$ and P2 that is smaller than the forward gaze point distance between $P_0$ and P1 having been provisionally set at the present moment.

Figure 4:
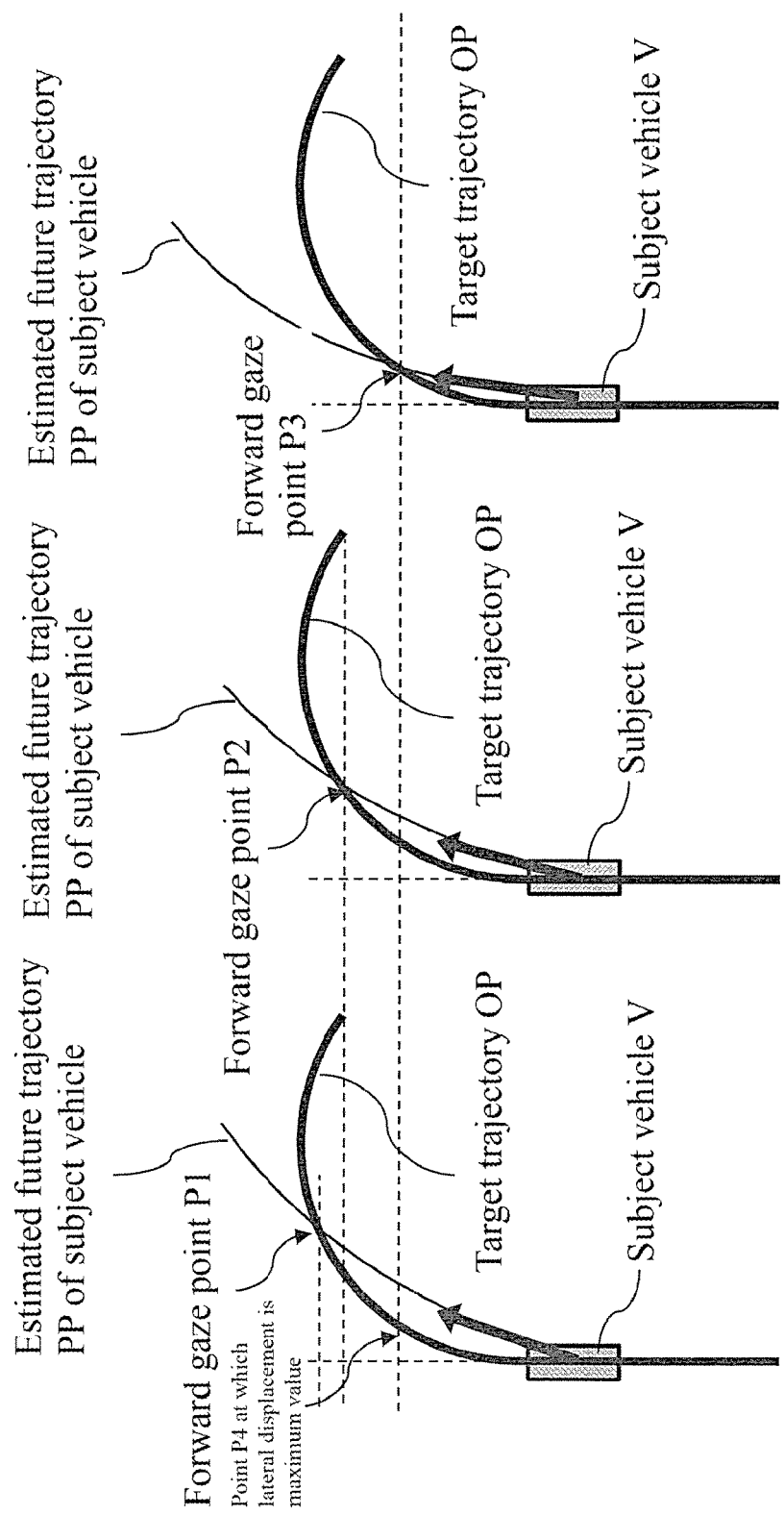
FIG. 4 is a plan view illustrating an example of a scene corresponding to the process of steps S2 to S5→S6→S2 to S5→S7 of FIG. 2.

The middle part of FIG. 4 is a plan view illustrating a scene in which the forward gaze point distance is changed to a forward gaze point distance between $P_0$ and P2 that is smaller than the forward gaze point distance between $P_0$ and P1 having been provisionally set last time. After the forward gaze point distance is changed to the forward gaze point distance between $P_0$ and P2 as illustrated in the middle part of FIG. 4, the process returns to step S2, in which the lateral displacement for the forward gaze point distance P2 and the target steering angle corresponding thereto are calculated again, and the future traveling trajectory PP of the subject vehicle is estimated again. Then, as illustrated in FIG. 5, a number of values of the lateral displacement $\Delta d$ are calculated at a predetermined interval, and the maximum value $\Delta d_{max}$ is obtained from among these values. Here, when the maximum value $\Delta d_{max}$ of the lateral displacement is the predetermined value D or less, the process proceeds to step S7, in which the forward gaze point distance (distance between $P_0$ and P2 herein) having been provisionally set at that time is definitely set as an actual forward gaze point distance.

On the other hand, when, in step S5, the maximum value $\Delta d_{max}$ of the lateral displacement is not the predetermined value D or less, the process proceeds to step S6, in which the forward gaze point distance is changed to a forward gaze point distance between $P_0$ and P3 that is smaller than the forward gaze point distance between $P_0$ and P2 having been provisionally set at the present moment, and the process returns to step S2. The process of steps S2 to S5 is repeated until the maximum value $\Delta d_{max}$ of the lateral displacement becomes the predetermined value D or less. The right part of FIG. 4 is a plan view illustrating a scene in which the forward gaze point distance is changed to a forward gaze point distance between $P_0$ and P3 that is smaller than the forward gaze point distance between $P_0$ and P2 having been provisionally set last time.

In the above description, the forward gaze point distance to be provisionally set is successively reduced for selection as illustrated in FIG. 4 in the order of the left part→the middle part→the right part. In an alternative embodiment, the position P4 on the target trajectory OP (see FIG. 5 in detail) at which the lateral displacement between the target trajectory OP and the traveling trajectory PP of the subject vehicle estimated in the left part of FIG. 4 is the maximum value $\Delta d_{max}$ may be employed as the forward gaze point distance P3 to be provisionally set next time. This is because when the forward gaze point distance between $P_0$ and P1 having been provisionally set in the left part of FIG. 4 is changed directly to the forward gaze point distance between $P_0$ and P4, at least the probability of becoming the predetermined value D or less increases as compared with when the forward gaze point distance to be provisionally set is successively reduced for selection as illustrated in FIG. 4 in the order of the left part→the middle part→the right part, and the number of times of calculation can thus be reduced.

Figure 6:
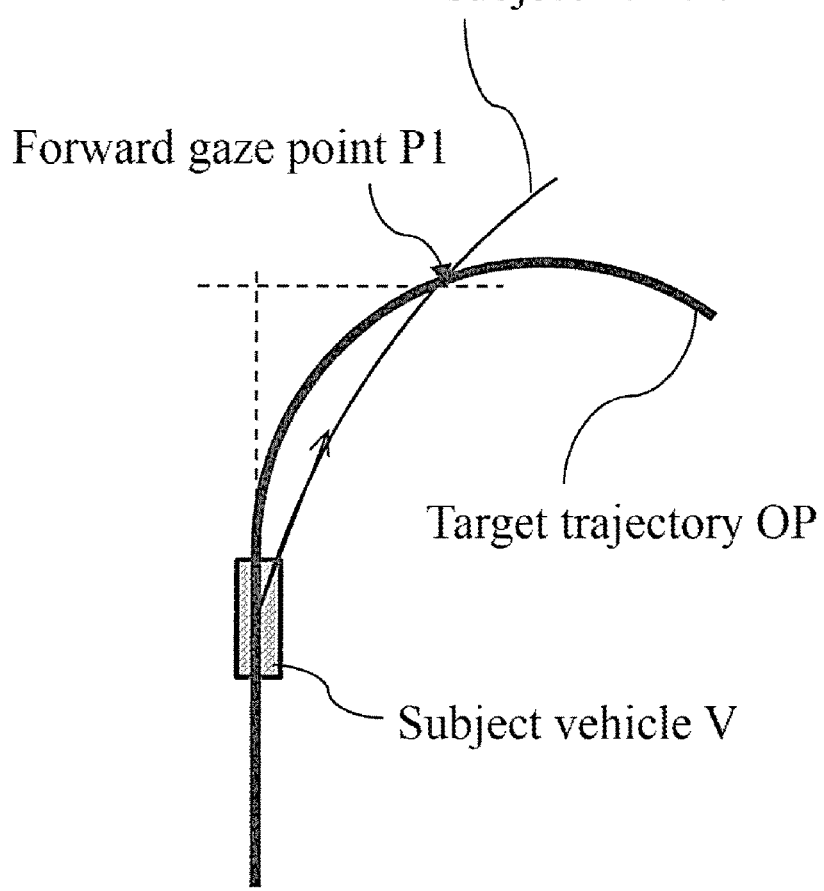
FIG. 6 is a plan view illustrating an exemplary travel (comparative example) of taking a shortcut of the subject vehicle that takes place when the process of steps S2 to S7 of FIG. 2 is not executed.

FIG. 6 illustrates a state in which the subject vehicle is about to enter a curve having a small curvature radius from a straight traveling lane. When traveling in the straight traveling lane, the vehicle body axis of the vehicle V coincides with the traveling direction of the vehicle V, but as the turning motion starts, a slip angle occurs between the vehicle body axis of the vehicle V and the traveling direction of the vehicle and they may not necessarily coincide with each other. When entering at a relatively low speed from a straight line to a curve having a small curvature radius R as in the case of entering the entrance of an intersection, if the vehicle is controlled to travel with a target steering angle that makes the trajectory of the vehicle coincide with the target trajectory at the forward gaze point P1, the vehicle trajectory tends to significantly deviate from the target trajectory toward the inside of turning (tends to take a shortcut).

If the target steering angle is calculated on the basis of an initial set value of the forward gaze point distance that is set merely in accordance with the vehicle speed or the like, the forward gaze point distance between $P_0$ and P1 will be given without consideration for the maximum error between the vehicle trajectory and the target trajectory, which is taken into account in the present embodiment. When the shape of the target trajectory is complicated and/or when the curvature change is large, therefore, the deviation amount toward the inside of turning may possibly be a large value which cannot be ignored, and concerns are that the subject vehicle may run off the traveling lane and/or the wheels may unduly come close to curbstones.

Figure 7:
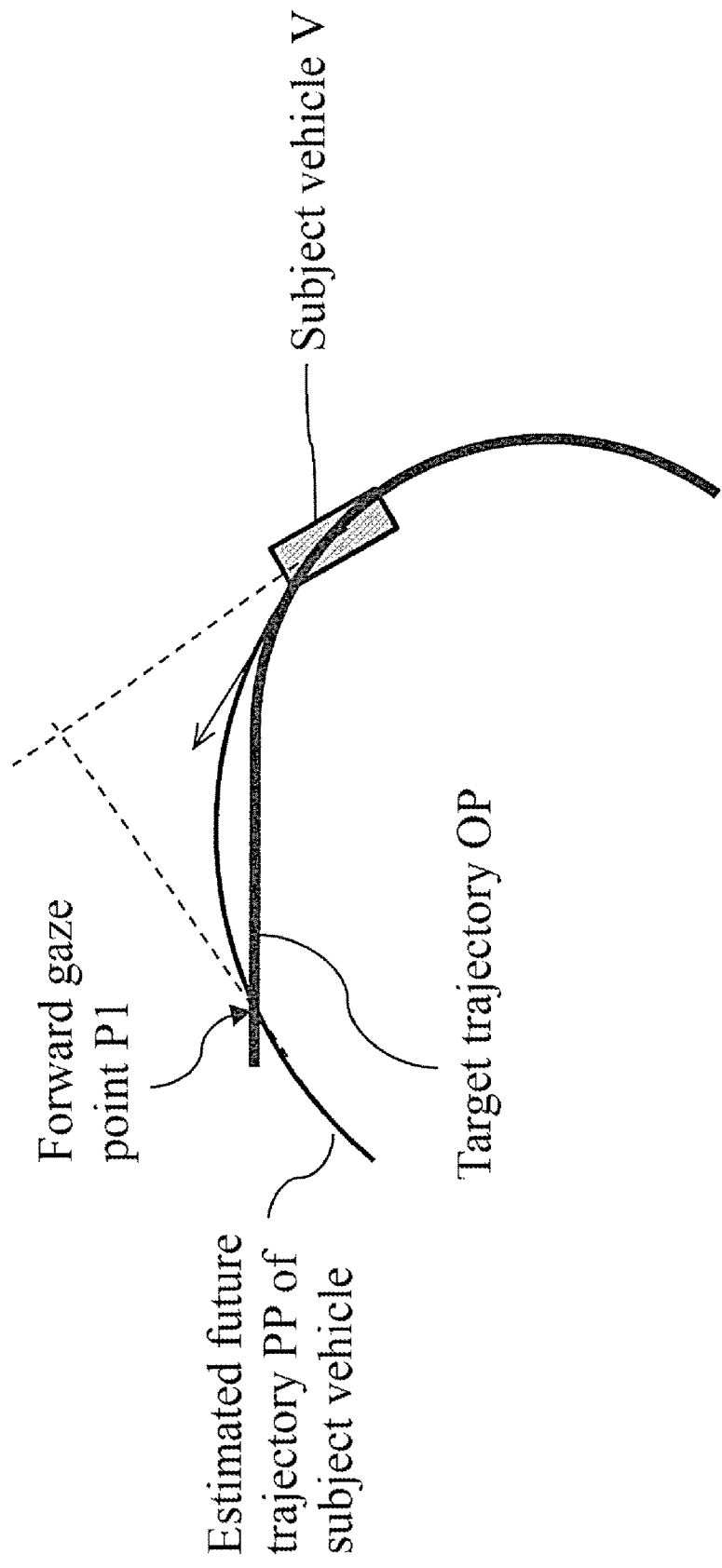
FIG. 7 is a plan view illustrating an exemplary travel (comparative example) of taking a detour of the subject vehicle that takes place when the process of steps S2 to S7 of FIG. 2 is not executed.

As illustrated in FIG. 7, the opposite problem may arise when exiting a curve having a small curvature radius R toward a straight traveling lane as in the case of traveling through the exit of an intersection. That is, the curvature radius R of the road increases toward the straight traveling lane during the travel with a large slip angle along the target trajectory on the curve having a small curvature radius R. This reduces the target steering angle and the slip angle also varies to a small value, so that the traveling direction of the vehicle bulges outward with respect to the target trajectory as the vehicle travels from the exit of the curve toward the straight portion, and the vehicle may take a detour.

In contrast to the above, in the present embodiment, before the actual forward gaze point distance used for the lane-keeping travel control is set, the traveling trajectory PP of the subject vehicle is estimated for the provisionally-set forward gaze point distance and an appropriate forward gaze point distance is searched for until the maximum value $\Delta d_{max}$ of the lateral displacement between the estimated traveling trajectory PP of the subject vehicle and the target trajectory OP becomes the predetermined value D or less. Through this operation, the forward gaze point distance to be actually set is already optimized. As a result, the subject vehicle can be appropriately controlled to travel in an automated or autonomous manner along the target trajectory without taking a shortcut or a detour with respect to the target trajectory.

Moreover, in the present embodiment, the forward gaze point distance to be definitely set is a distance between $P_0$ and P4 to the position P4 on the target trajectory at which the lateral displacement between the target trajectory OP and the traveling trajectory PP of the subject vehicle estimated on the basis of the provisionally-set forward gaze point distance is the maximum value $\Delta d_{max}$. Thus, the probability that the maximum value $\Delta d_{max}$ of the lateral displacement becomes the predetermined value D or less is high even when the calculation of the lateral displacement between the target trajectory and the estimated trajectory of the subject vehicle is performed only once. As a result, iterative calculation is not necessary and the calculation load can be reduced.

Furthermore, in the present embodiment, the forward gaze point distance to be definitely set is the maximum distance among a number of values of the forward gaze point distance in which the maximum value $\Delta d_{max}$ of the lateral displacement between the target trajectory OP and the traveling trajectory PP of the subject vehicle estimated on the basis of the provisionally-set forward gaze point distance is the predetermined value D or less. The forward gaze point distance to be definitely set is therefore a value that allows the quick followability to the target trajectory and the stability of the vehicle behavior to be optimally balanced.

Moreover, in the present embodiment, when the maximum value $\Delta d_{max}$ of the lateral displacement exceeds the predetermined value D, until the maximum value $\Delta d_{max}$ of the lateral displacement becomes the predetermined value D or less, the forward gaze point distance to be provisionally set is successively changed (e.g., successively changed to a smaller value) and the traveling trajectory of the subject vehicle is estimated again for each of the forward gaze point distances which are thus changed and set again. Thus, the calculation of the lateral displacement between the target trajectory OP and the estimated trajectory PP of the subject vehicle can be performed by a finite number of iterative calculations. Furthermore, the maximum value $\Delta d_{max}$ of the lateral displacement between the target trajectory OP and the estimated trajectory PP of the subject vehicle is used as an evaluation index for the lane-keeping travel control and it can therefore be ensured that the maximum value $\Delta d_{max}$ of the lateral displacement becomes the predetermined value D or less.

The above-described control device 17 corresponds to the controller of the present invention.

DESCRIPTION OF REFERENCE NUMERALS

10 Travel control apparatus
11 Subject vehicle position detection device

12 Map database
13 Vehicle speed sensor
14 Camera
15 Input device
16 Drive mechanism
17 Control device
V Subject vehicle
OP Target trajectory
PP Estimated future trajectory of subject vehicle
P1, P2, P3 Forward gaze point
Δd Lateral displacement between target trajectory and estimated trajectory of subject vehicle
$\Delta d_{max}$ Maximum value of lateral displacement between target trajectory and estimated trajectory of subject vehicle

The invention claimed is:

1. A travel control method for a vehicle wherein a target trajectory along which a subject vehicle should travel is detected and the subject vehicle is controlled to travel in an autonomous manner along the detected target trajectory, the travel control method for a vehicle comprising:
provisionally setting a forward gaze point distance from the subject vehicle to a forward gaze point at least in accordance with traveling lane information;
estimating a traveling trajectory of the subject vehicle in which the subject vehicle coincides with the target trajectory at the forward gaze point if the subject vehicle travels the provisionally-set forward gaze point distance;
detecting a maximum value of a lateral displacement between the estimated traveling trajectory of the subject vehicle and the target trajectory during travel from a current position of the subject vehicle to the forward gaze point; and
definitely setting the forward gaze point distance when the maximum value of the lateral displacement is a predetermined value or less as an actual forward gaze point distance and then controlling the subject vehicle to travel in an autonomous manner on a basis of the definitely-set forward gaze point distance.

2. The travel control method for a vehicle according to claim 1, wherein the forward gaze point distance to be definitely set is a distance to a position on the target trajectory at which the lateral displacement between the target trajectory and the traveling trajectory of the subject vehicle estimated on a basis of the provisionally-set forward gaze point distance is the maximum value.

3. The travel control method for a vehicle according to claim 1, wherein the forward gaze point distance to be definitely set is a maximum distance among a number of values of the forward gaze point distance in which the maximum value of the lateral displacement between the target trajectory and the traveling trajectory of the subject vehicle estimated on a basis of the provisionally-set forward gaze point distance is the predetermined value or less.

4. The travel control method for a vehicle according to claim 1, wherein when the maximum value of the lateral displacement between the target trajectory and the traveling trajectory of the subject vehicle estimated on a basis of the provisionally-set forward gaze point distance exceeds the predetermined value, until the maximum value of the lateral displacement becomes the predetermined value or less, the forward gaze point distance to be provisionally set is successively changed and the traveling trajectory of the subject vehicle is estimated again for the forward gaze point distance which is thus changed and set again.

5. The travel control method for a vehicle according to claim 4, wherein when the maximum value of the lateral displacement between the target trajectory and the traveling trajectory of the subject vehicle estimated on the basis of the provisionally-set forward gaze point distance exceeds the predetermined value, the forward gaze point distance to be provisionally set is successively reduced until the maximum value of the lateral displacement becomes the predetermined value or less.

6. A travel control apparatus for a vehicle, comprising a controller configured to detect a target trajectory along which a subject vehicle should travel and to control travel of the subject vehicle so that the subject vehicle is controlled to travel in an autonomous manner along the detected target trajectory,
the controller being further configured to:
provisionally set a forward gaze point distance from the subject vehicle to a forward gaze point at least in accordance with traveling lane information;
estimate a traveling trajectory of the subject vehicle in which the subject vehicle coincides with the target trajectory at the forward gaze point if the subject vehicle travels the provisionally-set forward gaze point distance;
detect a maximum value of a lateral displacement between the estimated traveling trajectory of the subject vehicle and the target trajectory during travel from a current position of the subject vehicle to the forward gaze point; and
definitely set the forward gaze point distance when the maximum value of the lateral displacement is a predetermined value or less as an actual forward gaze point distance and then control the subject vehicle to travel in an autonomous manner on a basis of the definitely-set forward gaze point distance.

* * * * *